United States Patent [19]

Lind

[11] Patent Number: 4,746,229

[45] Date of Patent: May 24, 1988

[54] SUPPORTING AND CARRYING DEVICE FOR A ROTATABLE MEMBER

[75] Inventor: Bjorn Lind, Billdal, Sweden

[73] Assignee: Aktiebolaget SKF, Goteborg, Sweden

[21] Appl. No.: 64,093

[22] Filed: Jun. 18, 1987

[30] Foreign Application Priority Data

Jul. 7, 1986 [SE] Sweden ............................... 8603002

[51] Int. Cl.[4] ............................................ F16C 32/06

[52] U.S. Cl. .................................... 384/124; 384/223

[58] Field of Search ............... 384/124, 223, 104, 220, 384/123, 119

[56] References Cited

U.S. PATENT DOCUMENTS

| | | | |
|---|---|---|---|
| 3,806,209 | 4/1974 | Laing et al. | 384/104 |
| 3,836,212 | 9/1974 | Hepp et al. | 384/223 |
| 4,045,098 | 8/1977 | Blondeel | 384/104 |
| 4,618,270 | 10/1986 | Kraus | 384/124 |

*Primary Examiner*—Lenard A. Footland

*Attorney, Agent, or Firm*—Eugene E. Renz, Jr.

[57] ABSTRACT

The invention refers to a device for supporting and carrying, e.g. a centrifugal rotor. For making possible an adjustment of the rotor thus that any possible unbalance is eliminated as far as possible, the rotor is supported upon a supporting element, on which it is radially displaceable. Between the rotor and the supporting element is provided a bearing part. This is rotatable and displaceable laterally on the supporting element and carries the rotor with means, which incorporate deformable members, which allow a tilting of the rotor upon the bearing part.

3 Claims, 1 Drawing Sheet

SUPPORTING AND CARRYING DEVICE FOR A ROTATABLE MEMBER

The invention refers to a device of the type defined in the preamble of claim 1.

The invention is useful, e.g. for supporting a centrifuge rotor, which carries a variable load, the position of which under operation cannot be predetermined, whereby the rotor might create big out-of-balance forces, if it is rigidly suspended and supported. It is earlier known to suspend the rotor and its driving device resiliently upon a base in order thereby to dampen vibrations during operation. Such known arrangements usually incorporate considerably vibrating masses, which subject the bearing to big mass forces.

It is also known to arrange a rotor tiltably in a driven support device and to balance the rotating system by means of a liquid mass (U.S. Pat. No. 2,831,369). Such a device is rather complex and requires a tight and elastic container for a rather big liquid mass, which loads the bearing system.

To support a rotor upon a mainly plain supporting bearing which allows displacement of the rotor radially upon the supporting bearing in order to bring about a balancing of a mass, which is eccentric relative to the rotational axis, has also been proposed earlier. Such an arrangement, however, mainly can compensate unbalanced masses in a single plane parallel to the supporting surface of the supporting bearing. For an optinum balancing of a rotor having rather a big axial extension is required that the position of the rotor relative to the bearing surface can be adjusted more freely, and the purpose of the present invention is to provide a light and uncomplicated device of the type mentioned above, in which a comparatively long rotor, e.g. a centrifuge drum can be balanced for giving during operation as small vibrations as possible. This is achieved according to the invention in that the device has the features defined in claim 1.

Such a device can be manufactured from simple elements, which cooperate with each other in an uncomplicated manner, and the rotor can adjust itself freely, thus that the rotor axis coincides with the mass center even if it is not parallel with the geometrical axis of the rotor, whereby two plane bearing surfaces always can be parallel and perpendicular to the rotational axis.

Figure 1:
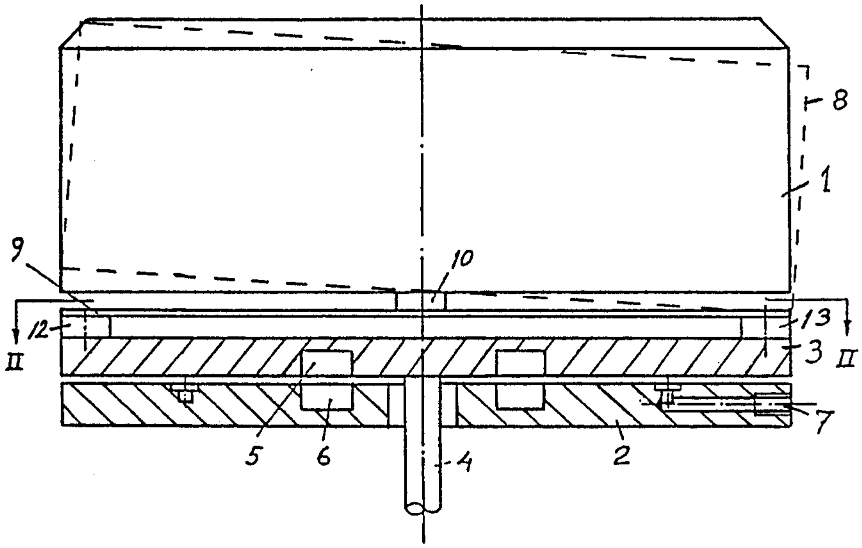
Figure 2:
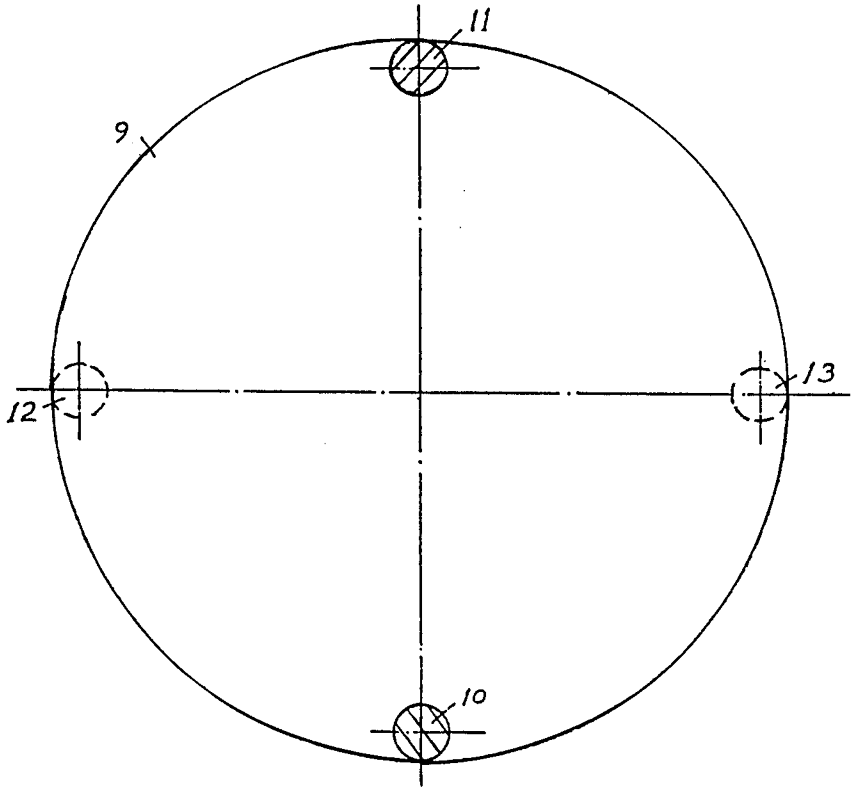

The invention will be further described hereinafter with reference to the accompanying drawing, in which FIG. 1 shows a side view partially in cross-section; and FIG. 2 shows a view along line II—II in FIG. 1 of a device according to an embodiment of the invention.

The device according to the invention carries a rotatable member 1 in the form of e.g. a centrifuge rotor and incorporates a supporting element 2 having a supporting surface upon which the member 1 is rotatably supported and radially displaceable. The supporting surface constitutes a bearing surface, which cooperates with an opposed surface upon a bearing part 3 provided between the rotatable member and the supporting element 2. The bearing surfaces are preferably mainly plane, whereby the bearing part 3 is rotatable and radially displaceable upon the supporting surface. The rotation can be effected, e.g. by an electromotor, known per se, and having a shaft 4, which is arranged with big clearance in a bore through the supporting element 2, thus that the mobility radially is not limited by the shaft lead-through. Centering and retention of the bearing surfaces can be effected, e.g. by annular magnetic elements 5, 6 which attract each other, but allow displacement of the bearing part 3 laterally on the supporting surface. The bearing can incorporate a pressure fluidum which separates the bearing surfaces. Such a fluidum can be introduced from an external pressure source through a conduit 7 and can be spread between the bearing surfaces in a manner known per se.

The member 1 is supported upon the bearing part 3 by means, which incorporate deformable members allowing a tilting of the member 1 on the bearing part 3 and carries along the member 1 in the rotation of bearing part 3. The dash-lined contour 8 shows the member 1 in tilted position. The bearing part 3 cannot be tilted itself relative to the supporting element 2 to any mentionable degree. The deformable members can incorporate a flexible membrane 9, in the form e.g. of a plane circular disc, which is attached to the rotatable member 1 at two diametrically opposed positions 10, 11 and to the bearing part 3 at two diametrically opposed positions 12, 13 arranged displaced at about 90° relative to the first mentioned positions. Due to the flexibility of the membranes and its connection to the surrounding means it is possible to tilt the rotatable member 1 in any plane relative to the bearing part 3 and to the supporting element 2.

The rotating system which incorporates the member 1, the bearing part 3 and the intermediary supporting unit thereby can be allowed to adjust itself thus that the unbalance forces are minimized. Due to the fact that member 1 can be tilted, it is possible to adjust the positions of masses present therein in relation to the rotational axis at different levels, and which positions cannot be predetermined, thus that the smallest possible unbalance forces occur at the rotation. In the parts of the system which are not tiltable, there are no masses causing unpredictable unbalance. Eccentric masses are compensated by the adjustability of the bearing part 3 laterally on the supporting element 2, which means that the rotation can always be effected about the mass center. The bearing part 3 is thereby always substantially parallel with the bearing surface of the supporting element 2, whereby the constant slot can be maintained between the bearing surfaces.

Other embodiments of the invention than that described above are possible. The driving can, for instance, be effected in another way than by the described motor arrangement, such as with a plane electromotor with stator in the supporting element 2 and rotor in the bearing part 3. Centering of the bearing part 3 can be effected in another way than with magnetic means, e.g. with use of a pliable bendable driving shaft from the motor. The bearing surfaces on elements 2 and 3 may e.g. be designed as sliding bearing surfaces or be separated by a medium with a dynamically created pressure. For supporting the rotating member 1 on the bearing part 3 different arrangements can be used. A number of piston and cylinder members and springs can, e.g. be arranged between the bearing part 3 and the rotatable member 1. The member 1 can be constituted by a centrifuge, a separator or any other rotatable element.

What is claimed is:

1. A device for supporting and carrying a rotatable member (1), incorporating a supporting element (2) having a support surface upon which the member (1) is rotatably supported and radially displaceable, characterized by a bearing part (3) provided between the rotatable member and the supporting element, which bearing part is equipped with a surface intended for cooperation with an opposed supporting surface on the supporting element, whereby the bearing part is rotatable and radially displaceable upon the supporting surface, the bearing part further being equipped with means (9, 10, 11, 12, 13) for supporting the rotatable member on the bearing part, said means incorporating deformable members (9), which allow a tilting of the rotatable member on the bearing part (3).

2. A device as claimed in claim 1, characterized by means (7) for separating the supporting surface of the supporting element (2) and the opposed surface of the bearing part (3) by aid of a pressure medium.

3. A device as claimed in claim 1, characterized thereby, that the deformable members incorporate a flexible membrane (9) attached to the rotatable member (1) at two diametrically opposed positions (10, 11) and to the bearing part at two diametrically opposed positions (12, 13), which are displaced at about 90° relative to the first-mentioned positions.

* * * * *